A. MORISON.
BEET HARVESTER.
APPLICATION FILED AUG. 16, 1912. RENEWED AUG. 21, 1913.
1,090,871.
Patented Mar. 24, 1914.
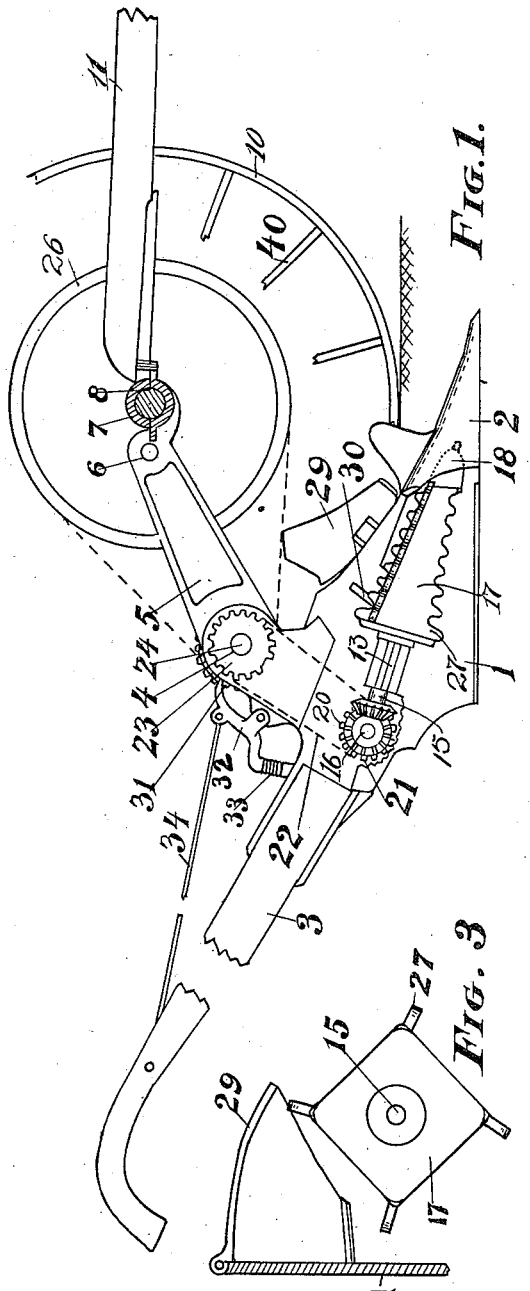
WITNESSES:
Christine A. Braidel.
Winifred DeVaney.
INVENTOR
Alexander Morison
BY
Geo. B. Willcox ATTORNEY

UNITED STATES PATENT OFFICE.

ALEXANDER MORISON, OF SAGINAW, MICHIGAN.

BEET-HARVESTER.

1,090,871. Specification of Letters Patent. Patented Mar. 24, 1914.

Application filed August 16, 1912, Serial No. 715,347. Renewed August 21, 1913. Serial No. 786,008.

*To all whom it may concern:*

Be it known that I, ALEXANDER MORISON, a citizen of the United States, residing at Saginaw, in the county of Saginaw and State of Michigan, have invented certain new and useful Improvements in Beet-Harvesters; and I do hereby declare the following to be a full, clear, and exact description of the invention, such as will enable others skilled in the art to which it appertains to make and use the same.

This invention is a machine for harvesting beets, chicory, and similar roots, and the invention pertains more particularly to improved means for lifting the beets from the ground, for regulating and setting to operate the digger at its proper depth in the ground, and for breaking up the soil near the beets and lifting them clear of the ground without liability of injuring them.

With these and certain other objects in view which will appear later in the specification, my invention consists in the devices described and claimed and the equivalents thereof.

In the drawings, Figure 1 is a side elevation of the harvester broken away in part; Fig. 2 is a top plan view likewise broken away and some of the parts removed; Fig. 3 is an end elevation of the digger and the hinged shoe that protects it; and Fig. 4 is a top plan view of the rotating digger.

As is clearly shown in the drawings, the device consists in a land side 1 having a plow point 2 at one end and plow handles 3 at the opposite end. At the top of the land side is a bearing 4 in which is pivotally mounted a draft arm 5, the forward end of which is secured by means of a pivot 6 to the hub 7 which receives the axle 8 of two vehicle wheels 9 and 10. Secured to the hub 7 is the tongue 11.

Fixed to one face of the land side is a housing 12 carrying shaft bearings 13 and 14 in which are received the shafts 15 and 16. Fixed to shaft 15 is a revoluble digger 17, the details of which will presently be described.

The forward end of shaft 15 is revolubly supported in a recess 18 of the plow point 2. Miter gears 19 and 20 are fixed to shafts 15 and 16. A sprocket wheel 21 is keyed to shaft 16 and is driven by a sprocket chain 22 from a drive sprocket 23 fixed to a shaft 24 that revolves in the bearing 4. To the opposite end of shaft 24 is fixed a sprocket 25 which is driven by a sprocket 26 fixed to the hub of wheel 10. When the harvester is drawn along the ground, wheel 10 drives digger 17 in the direction indicated by the arrows, through the connections just described.

The digger is also seen from inspection of Figs. 3 and 4 as rectangular in cross-section, but smaller at the forward end than at the rear end. The increase in size from front to rear, as shown in Fig. 4, is gradual until near the rear end, where the lateral edges 27 of the side members 28 are curved outwardly, as shown in Figs. 1, 2 and 4. The edges 27 project beyond the body of the digger and are serrated throughout their length, the serrations being for the purpose of breaking up the soil around the beets. The curved serrated edge shown at 27 in Fig. 4 is provided to give a firmer grip against the beet and a quicker lift after the beet has become loosened by the point 2 and the forward part of digger 17. It has a saw-like scraping and cutting action on the soil that prevents the tendency that the digger would otherwise have, to come to the surface of the ground, especially when operating in hard earth. It also exerts a more effective lifting force against the beet. It is evident that the peripheral speed of the rear end of the digger is greater than at the smaller front end, whereby the beet is lifted faster and higher as the rear part of the digger approaches.

Another advantage of the serrated edge is that when used in hard ground, the serrations, by cutting somewhat gradually into the solid wall of earth at the outer side of the digger, reduce the liability of blocking the machine.

Above the digger and hinged to the land side 1 is a shoe 29 which is shown raised in Fig. 1 and in its working position in Fig. 2. This shoe forms a continuation of the forward lifting surface of point 2. The shoe overlies the digger 17, the outer edge of the shoe being substantially parallel with the axis of the digger, as shown in Fig. 2, there being sufficient clearance, however, between the upper part of the revolving digger and the edge of shoe 29, as shown in Fig. 3, to permit smaller pieces of dirt to be carried around by the digger, passing under the shoe 29 and dropping down between the land side 1 and the digger 17. The shoe 29, however, prevents the bulk of the soil and the beet, which pass up from the point 2, from dropping in between the digger and the land side, which might tend to clog the machine. A lug 30 is fixed to the land side, the upper face of the lug supporting the hinged shoe 29. The shoe may be lifted as shown in Fig. 1, to give access to the space between the digger and the land side. The shoe being hinged to the land side, its free edge may rise and fall, so that smaller chunks of earth and stones if carried up by the action of the digger and entered under the outer edge of the shoe, will cause it to rise to allow the material to pass through, thus avoiding obstructing the digger.

To regulate the depth of the point 2, the rear end of draft arm 5 may be raised or lowered and locked in any desired adjusted position. To this end I provide ratchet teeth 31 around the hub of draft arm 5, and upon the land side I mount a pivoted pawl 32, one end of which engages the ratchet teeth 31. The pawl is spring-pressed by means of a compression spring 33 so as to normally be in contact with the ratchet teeth 31. To release the pawl I provide a rod 34 connected at one end to the pawl and secured at the other end to one of the handles 3 by means of an L-shaped hand latch 35, so that pressing the hand latch against the handle will release the pawl and enable the handles to be raised and lowered so as to change the inclination of the point 2, and consequently the depth of digging.

When the pawl 32 is locked in the teeth 31, draft arm 5 serves as a rigid part of the land side, thereby relieving the operator of the machine of much of the strains due to jerking, that would otherwise be brought upon the handles.

Another object in hinging the arm 5 to the land side 1 as shown, is to enable the digger to be lifted clear of the ground for convenience in turning the machine around when the end of a row of beets is reached. To accomplish this, the operator releases latch 32, bears down upon the handles and thereby tilts the point 2 upward until the forward movement of the machine has run the point out of the ground and the rear part of the land side is sliding on the surface of the ground. The pawl is then engaged in the gear 31, and when the handles are lifted by the operator, the digger hangs clear of the ground.

By the means above described I have produced a simple and inexpensive, yet efficient harvester that is not liable to clog in heavy soil, that can be easily adjusted as to depth, and that lifts the beets by a combined preliminary loosening of the earth and a subsequent breaking up of the soil. Quick lifting of the beets is produced by the curved lateral edges of the digger.

This device not only rapidly lifts the beets without injuring them, but also materially assists in subsequent cultivation by breaking up the soil while performing its function as a harvester.

Having described my invention, what I claim and desire to secure by Letters Patent, is:—

1. The combination with a land side and a plow point secured thereto, of a revoluble digger pivoted at its front end to the rear of the plow point and revolubly supported at its rear end in bearings secured to the land side, and a shoe hinged to the land side and adapted to overlie the digger.

2. In combination with a land side, a digger carried by said land side, said digger comprising a revoluble member smaller at its forward end than at its rear end, said member being rectangular in cross-section and having laterally disposed edges projecting beyond its sides.

3. In combination with a land side, a digger carried by said land side, comprising a revoluble member, smaller at its forward end than at its rear end, said member being rectangular in cross-section and having laterally disposed serrated edges projecting beyond the sides, said lateral edges being curved outwardly near their rear ends.

4. The combination with a land side and a plow point secured thereto, of a revoluble digger pivoted at its front end to the rear of the plow point and revolubly supported at its rear end in bearings secured to the land side, and a shoe hinged to the land side and adapted to overlie the digger, and a lug fixed to the land side, the upper face of said lug supporting the hinged shoe out of contact with the digger.

5. In a machine of the class described, a land side, a pair of vehicle wheels, an axle mounted thereon, an arm pivotally secured at its rear end to the upper part of said land side and pivotally supported at its front end by said axle, means for locking said arm to said land side in various angularly adjusted positions, together with a revoluble digger mounted on said land side and geared to said axle.

6. In a machine of the class described, a digger comprising a revoluble member smaller at its forward end than at its rear end, said member having laterally disposed outwardly projecting serrated edges.

7. In a machine of the class described, a digger comprising a revoluble member having laterally disposed projecting wings, the outer edges of said wings being serrated, for the purposes set forth.

In testimony whereof, I affix my signature in presence of two witnesses.

ALEXANDER MORISON.

Witnesses:
CHRISTINE A. BRAIDEL,
WINIFRED DEVANEY.

Copies of this patent may be obtained for five cents each, by addressing the "Commissioner of Patents, Washington, D. C."